United States Patent [19]

Freudenschuss et al.

[11] 4,064,520
[45] Dec. 20, 1977

[54] STILL PHOTOGRAPHIC OR MOVIE CAMERA

[75] Inventors: Otto Freudenschuss; Eduard Keznickl, both of Vienna; Robert Scheiber, Wiener Neudorf, all of Austria

[73] Assignees: Karl Vockenhuber; Raimund Hauser, both of Vienna, Austria

[21] Appl. No.: 572,331

[22] Filed: Apr. 28, 1975

[30] Foreign Application Priority Data

May 7, 1974 Austria ................................ 3750/74

[51] Int. Cl.² .............................................. G03B 3/00
[52] U.S. Cl. ................................... 354/196; 352/140
[58] Field of Search ......................... 354/25, 195, 196; 352/140; 353/76

[56] References Cited

U.S. PATENT DOCUMENTS 3,896,466  7/1975  Korpert ................................ 354/196

FOREIGN PATENT DOCUMENTS 240,620  6/1965  Austria ................................ 354/196
 18,015  5/1972  Japan ................................. 354/196

Primary Examiner—L. T. Hix
Assistant Examiner—Alan Mathews
Attorney, Agent, or Firm—Fleit & Jacobson

[57] ABSTRACT

A camera having a forward lens unit including a displaceable lens for providing a variable focal length, a film plane, a base objective having a fixed focal length, and an aperture diaphragm between the displaceable lens and the film plane together with automatic drive means for displacing the base objective axially in direct proportion to the diaphragm stop of the aperture diaphragm to thereby shift the image plane defined by the forward lens unit and the base objective and provide a substantially constant circle of diffusion at the film plane.

23 Claims, 12 Drawing Figures

STILL PHOTOGRAPHIC OR MOVIE CAMERA

This invention relates to a camera still or movie photography, having a lens of variable focal length and an aperture diaphragm.

BACKGROUND OF THE INVENTION

From Austrian Patent No. 240 620 an optical system is known that makes it possible in pancratic lenses to use the maximum depth-of-focus range required in each case, depending on the focal length. Such a lens is provided with a device that re-adjusts the focusing when the range setting is modified to the 'near-infinity' point that is, the distance at which the rear depth-of-focus range lies within infinity by, in a manner of speaking, a servo device for the focusing of zoom lenses in any focal setting, from close-up to infinity. The point of departure is a given aperture stop or the original diaphragm setting of the lens, in which the diameter of the circle of diffusion still shows an admissible value, i.e., when the eye still sharply perceives objects that lie in front or to the rear of the object plane proper.

When we now stop down the lens from the original diaphragm setting, the front depth-of-focus range will go beyond infinity. However, a considerable part of the depth-of-focus range available for picture taking will be lost thereby.

SUMMARY OF THE INVENTION

In accordance with the invention it is proposed, therefore, to provide a device which automatically shifts the focal plane of the lens on the image side in relation to an image-scanning plane, in dependence upon the depth-of-focus setting and upon the opening of the aperture diaphragm, to such an extent that in a pre-selected plane objects, especially those that are infinitely remote, may be practically always photographed with a constant circle of diffusion, independently of the setting of the focal length or of the opening of the aperture diaphragm. This offers the advantage that the front depth-of-focus moves considerably more closely to the focal point of the lens on the side of the object. This in turn means that the selection of a picture segment in a picture using the entire format can proceed much more freely. As a measure thereof, an optical reduction $V_{opt}$ may be used, as given by the formula $$V_{opt} = f/u$$

where $f$ is the focal length of the lens, and $u$ is the distance of the object from the focus on the side of the object. On the other hand, a larger aperture of the diaphragm may be allowed in case of very unfavorable lighting conditions, so that the optical reduction will remain the same.

To be sure, from Austrian Patent No. 280 779, an indicating device for the operator of a camera is known that indicates in the viewfinder of the camera whether the object is or is not within the depth-of-focus range. The control of the indicating device takes place in dependence on the adjusted focal length and on the required $f$ aperture. In the view finder, besides two curves etched on a ground glass, two pointers associated respectively with to these curves become visible; e.g. the size of the head of the photographer was sighted, as a comparative measurement between the pointers and curves, this being negligible as to diffusion effects. When the size of the head does not reach a predetermined measurement, the focal length must be re-adjusted. This design, as compared to the one of the invention, has the disadvantage that not only, first, the camera must be readjusted subsequently but, in addition, the visibility of the image through the viewfinder is hampered by the pointers and curves.

A particularly advantageous design of a camera in accordance with the invention and having a base objective assembly consisting of a pancratic front lens of variable enlargement and of a base lens of fixed focal length results when the device, preferably electrically-driven, is coupled with the base lens and adjusts the latter largely in proportion to a diaphragm stop $k = f/d$, of the aperture diaphragm in an axial direction, where $f$ designates the focal length of the objective and $d$ the diameter of its entrance pupil. As a matter of principle, the adjustment of the base objective could be derived from a motor serving other purposes, via switchable couplings and transmission gears. In accordance with a further development of the invention, however, it is proposed that the drive is used solely for the base objective, controllable in dependence on the diaphragm aperture stop while a follower control system preferably one that may be switched off has been provided that switches on the drive of the base objective, in the direction of the adjustment desired in each case, until the adjustment of the base objective agrees with the diaphragm aperture stop. The follower control system may, for instance, consist of a contact disk that has two non-conductive areas in which contact springs for the drive power supply of the base objective will engage after the adjustment of the base objective.

A particular simple design of the camera in accordance with the invention results when a preferably electrically operated drive for the lamellae of the aperture diaphragm is joined with the one for the base objective, while the base objective is coupled with the drive by means of a gear unit. In this case, it is an advantage when the electrically operated drive adjusts the lamellae of the aperture diaphragm via a symmetrical gear unit for instance a cam gear or a crank gear, while, starting with the position of the maximum shutter aperture, in both directions of rotation of the motor, the aperture diaphragm is adjusted by stopping down, and while a device is provided in the drive connection with the adjusting gear of the base objective, which, starting from the position corresponding to the maximum aperture, establishes the drive connection with the basic objective in one direction of rotation and interrupts it in the other direction of rotation, and that switching devices have been provided by means of which it is possible to reverse the polarity of the common drive motor and, if need be, to return it to the position corresponding to the maximal opening. A toothed segment that can be driven in both directions of rotation may serve as a transmission idler between the adjustment of the diaphragm lamellae and the adjustment of the base objective. However this toothed segment can be made to engage a drive wheel of the adjustment drive of the base objective only in one of the two directions of rotation, starting from the maximal diaphragm aperture.

In accordance with a further design of the invention, it is proposed to provide a device for determination of the quotient $q = f^2/k$, where $q$ is a factor that is proportional to the shortest allowable shooting distance, $f$ designates the focal length of the objective and $k$ denotes the diaphragm aperture stop. This device converts the setting of the pancratic front (head lens) and of the aperture diaphragm into values that are proportional to $f^2$ and $k$, preferably proportional to $\log f^2$ and $\log k$, with a device provided to interrelate the two values. It is well known that the distance $u$ of the depth-of-focus range from the focus on the side of the object, when the posterior depth-of-focus range of $u_2 = \infty$, is computed according to the equation:

$$u_1 = (f^2/U \times k \times 2.),$$

where $k$ is the diaphragm aperture stop and $U$ the allowable maximum diameter of the circle of diffusion. Consequently, $(1/2U)$ will become a constant factor which may be taken into account, e.g. in the scale graduation of an indicator device in the viewfinder of the camera.

The conversion of quotient $q$ may, take place electrically by means of a junction element connected with the device setting the focal length and with the one adjusting the diaphragm aperture, or perhaps mechanically by specially designed cam disks that interact with scanners. In the mechanical design, the difference of the adjusting path is constructed by means of a lever gear unit or similar device, which the scanners engage, the lever gear unit controlling the indicator device.

A particularly advantageous form of indication for the camera user results when a device for the determination of the optical reduction has been provided at the depth-of-focus limit $V_1 = c.(k/f)$, where $c$ is a constant factor, $k$ is the aperture stop, and $f$ denotes the focal length of the objective, and an indicator device, preferably in the viewfinder has been provided to indicate such a value, preferably in the form of symbols. The optical reduction may be determined whether by means of an electric junction device, or by a mechanical gear unit, in a way similar to the one used in finding the quotient $q$.

If the camera user should wish to take a picture without the servo-focusing device, for instance, so as to achieve special pictorial effects, the camera may be equipped with an objective drive that may be returned to zero position and switched off, and which render the indicator device ineffective for the shortest possible shooting range and/or for the optical reduction at the front depth-of-focus limit, when the base-objective drive has been switched off and/or is rendered ineffective with a setting of the front-lens range finder outside of the infinity setting. An additional advantage results when, in the case of a switched-off drive of the base objective, a range indicator, for instance a ground-glass plate, cross hairs or similar devices can be introduced into the path of the viewfinder rays.

Instead of the mechanical solution, of shifting the base objective in an axial direction, proportionately to the factor $k = (f/d)$, a simple solution with purely optical means is found in accordance with a further proposal of the invention, when the objective has at least over a certain area an aperture defect that displaces the optimal focal plane, in each case, as defined by the image by means of the marginal rays, essentially according to the condition $$v = U \times k,$$

where $v$ is the distance of the circle of diffusion, with a diameter of $U$, from the focus, in each case, and $k$ is the shutter stop as defined by the equation $k = (f/d)$, in which $f$ represents the length of focus in each case and $d$ represents the diameter of the diaphragm.

This solution has more advantages, over a mechanical design in accordance with the invention, since no drive mechanism for the lens is required, thereby simplifying considerably the lens mount. Nor does this design require any computing gear within the camera, since the circle of diffusion in the picture plane remains constant for all shutter apertures and since the special aperture defect is taken into account when the lens was calibrated. Small deviations from the lengths of the diameters may be disregarded, particularly in the case of smaller shutter apertures.

BRIEF DESCRIPTION OF THE DRAWINGS

Additional advantages and characteristics of the invention may be seen from the design specifications illustrated in the drawings in which.

DESCRIPTION OF THE PREFERRED EMBODIMENT

Figure 1:
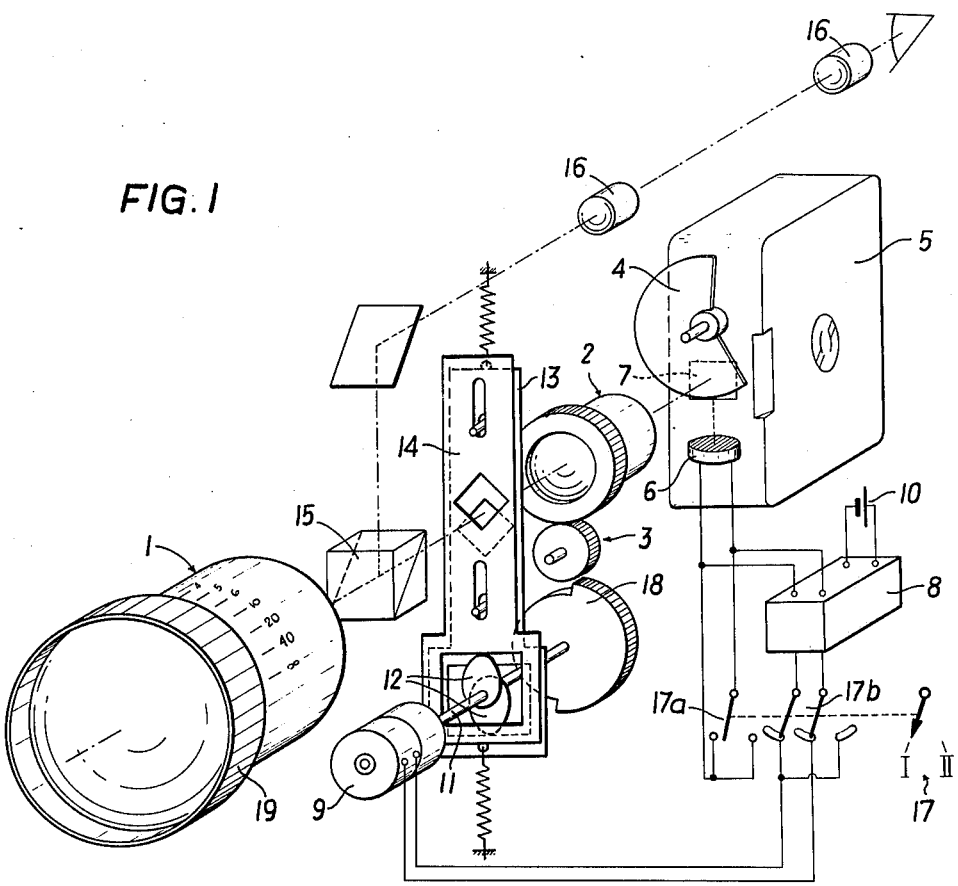
FIG. 1 shows, schematically a device in accordance with the invention mounted in a movie camera, parts that are not relevant to the invention, not being shown.

In FIG. 1, 1 designates a head (auxiliary lens) of a pancratic objective assembly whose pertinent base objective 2 is adjustable by way of a gear unit 3 to be described later. The head 1 has a front lens that can be adjusted by a knurled knob 19, in order to set the rear depth-of-focus range at certain distances. An image aperture 7 is periodically masked from the light entering from the head 1 and from the base objective 2, by means of a rotating shutter 4, while a film stored in a cassette 5 is moved by a ratchet powl not shown, in a familiar manner.

For the control of the correct exposure of the film there is a photoelectric cell 6, to which is directed the light for picture-taking that has been deflected by the shutter. The photoelectric cell 6 is coupled to a diaphragm control motor 9 via switching device 8, shown schematically, its being supplied by a battery 10. Two cam curves 12 have been placed on a motor shaft 11; each of which controls one diaphragm lamellae 13, 14, for stopping-down the light for picture-taking. Finally, a deflecting prism 15 has been placed between head 1 and the base objective 2; for diverting a small percentage of the light for picture-taking in a path of rays defined by an optical viewfinder system 16.

In the switching assembly 8, operating mode switch 17 is provided for two positions: position I for servo-focus operation and position II for normal operation without any servo-focus control. In both positions, I and II, diaphragm control motor 9 is governed by photoelectric cell 6. By throwing operating switch 17 into position II all that results is a change of rotation of the diaphragm control motor 9 (position I, for rotation counter-clockwise, and position II for rotation clockwise). It is necessary, however, when switching from position I to position II, or vice versa, to return the lamellae of the diaphragm to zero position at which the diaphragm aperture is the largest, and newly to determine, based on that position, the diaphragm setting, in dependence on the preselected direction of the drive.

To that end, contact 17a of operating mode switch 17 briefly short-circuits the photoelectric cell, during the change of rotation of the diaphragm control motor 9, thereby simulating a completely dimmed incidence of light. But since the polarity of control motor 9 has already been reversed (contact pair 17b), the lamellae 13, 14 of the diaphragm are returned to the zero position, inversely to the previously set direction. Contact 17a is closed for a short time only, by means of fulcrum spring acting on the operational mode switch 17, so that the direction of displacement of control motor 9 at the end of the switch-over is preprogrammed by the position of contact 17b, when contact 17a is opened.

The cams 12, 13 controlling lamellae 13 and 14 of the diaphragm have been designed, starting with the zero-position at maximum diaphragm aperture, as shown in FIG. 1, in such a way that a predetermined, reduced opening of the diaphragm will result from a rotation of shaft 11, in one direction as well as in the opposite one, around the same angle of rotation.

On shaft 11, within the range of the control gear unit 3 of the base objective, a toothed segment 18 has been mounted that, starting with the position shown in FIG. 1, meshes with a gear of the control gear unit 3, during counter-clockwise rotation of shaft II (position I for servo-focus). This means, in other words when the user of the camera has switched operational mode switch 17 to position I, the diaphragms 13, 14 are adjusted to the correct exposure time, while base objective 2 is regulated by the diaphragm motor 9 through a value transmitted in gear unit 3 and which is proportional to aperture stop $k$ so as to re-adjust the focal setting in the case of any variation of the focal length. Since the adjustment of the base objective takes place within very narrow limits, the shifting of the optical system may take place by way of a threaded socket provided with a fine thread.

In position II of operating switch 17, the polarity of diaphragm motor 9 is reversed. The displacement of lamellae 13, 14 takes place in this case, by the same amount as in the case of an adjustment in operational mode position I. It is true that, in case of a clockwise rotation of shaft 11, the toothed segment 18 sets its ungeared part against gear unit 3 so that no adjustment of base objective 2 is possible.

In order to permit the operator a controllable focusing of the objective, in position II of operational mode switch 17, a range indicator connected with operational switch 17 such as a pair of sectional wedges, may be switchable into the path of rays of the viewfinder.

Figure 2:
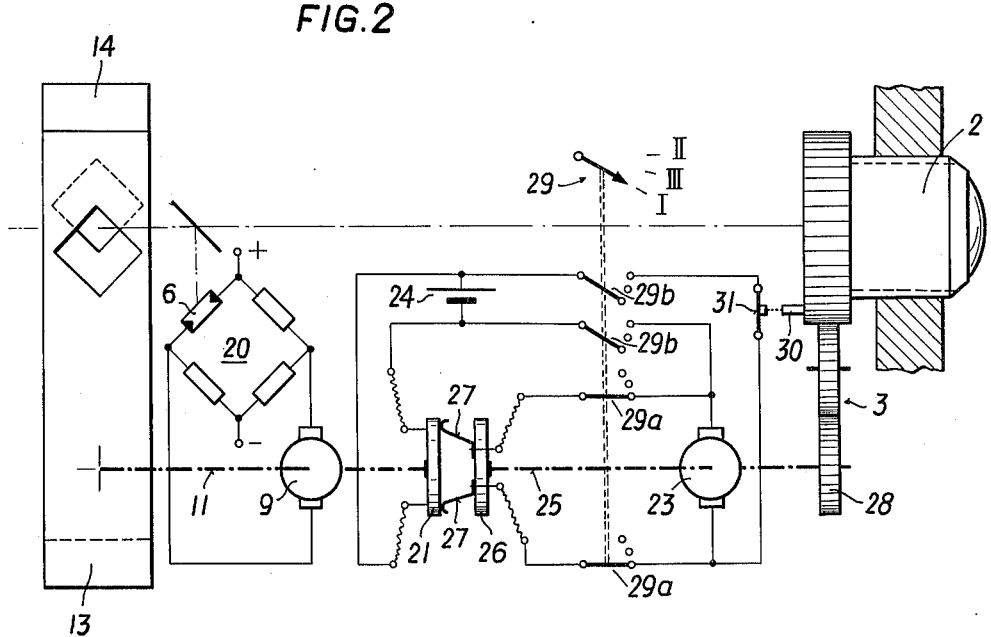
FIG. 2 is a schematic illustration of a modified drive control system for the base objective in the device of FIG. 1.
Figure 3:
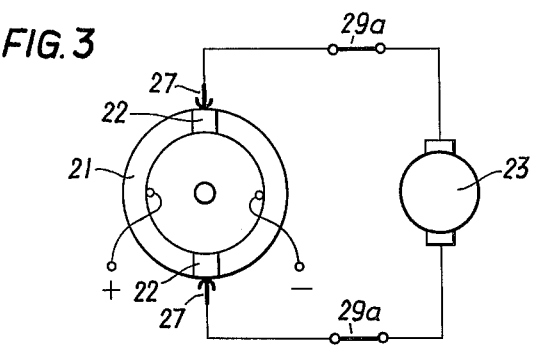
FIG. 3 is another view of a portion of the system of FIG. 2.

FIGS. 2 and 3 show an additional possibility of controlling the drive for the base objective in line with the control of the diaphragm. Diaphragm motor 9 controls, by way of motor shaft 11, the adjustment of the lamellae of diaphragms 13, 14, manner that is known as such. The power input to the motor is in depends on the diagonal voltage of a bridge 20, with photoelectric cell 6 hooked into one branch thereof. Shaft 11 is, in addition, connected with a contact disk 21 that is engaged by two axially counter-positioned circuit breakers 22. The contact disk is within the power circuit for a motor 23 adjusting the base objective 2, a battery 24 acting an energy source. Shaft 25 of the control motor 23 bears a disk 26 axially counter-positioned to disk 21, which supports two current collectors 27 that lie against the circuit breakers 22 of disk 21, in the zero-position, that is when the diaphragm aperture is largest (FIG. 3).

Shaft 25 also supports a gear wheel 28 that mates with the adjustment drive 3 of the basic objective. Within the electric circuit of the control motor 23 of the base objective, a set of switches 29 with three switch positions I, II, and III has been provided that serves as an operational mode switch. In position I, similar to the device in accordance with FIG. 1, the control motor 23 of the base objective is regulated in dependence on diaphragm motor 9. When contact disk 21 is rotated by shaft 11, the current collectors 27 are switched on to current-carrying planes and motor 23 draws via the closed set of switches 29e, the voltage of battery 24. The switch pair 29b, on the other hand, is open. When the correct diaphragm aperture has been set, contact disk 21 stops, and disk 26 with collectors 27 keeps turning until the collectors are opposite the circuit breakers. The adjustment of the base objective that is proportional to aperture stop $k$, is achieved by gear unit 3.

In position II, contact pair 29a is open, while pair 29b is closed and motor 23 draws directly from battery 24, but its polarity has been reversed.

Finally, switch 29 presents a position III, in which both switch pairs 29a, b, are open and no motor drive of the control gear unit of the base objective 3 is possible. Consequently, base objective 2 is returned to zero-position, that is, to the position in which the objective can be used also with normal range setting. At the end of the adjustment, a peg 30 mounted on the base objective, actuates a circuit breaker 31 in the drive circuit of control motor 23. Upon renewed servo-focus adjustment, motor 23 will be controlled by contact disk 21 and switch 31 will be again closed.

Figure 4:
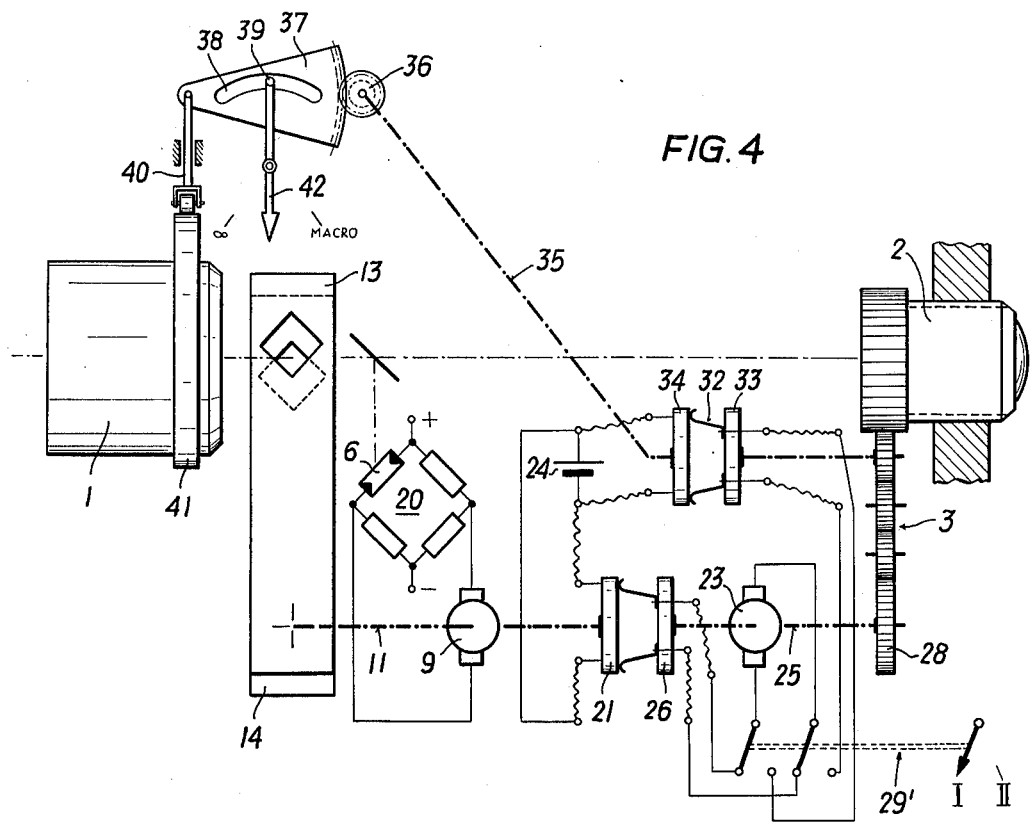
FIG. 4 is a schematic illustration of another modification of the drive control system for the base objective in the device of FIG. 1.

FIG. 4 shows a further design in accordance with the invention. Parts having the same functions have been designated by the same reference numbers as in FIGS. 2 and 3. The only difference is that the operating mode switch 29' in position II connects the control motor 23 of the base objective to additional current collectors 32 which have been mounted on a disk 33 that is connected with control gear unit 23 of the base objective, and therefore are functionally similar to disk 26.

A contact disk 34 mounted fixedly on a shaft 35, is placed axially opposite disk 33, but without any connecting gear. Disk 34 has been connected, similarly to disk 21, directly to battery 24 and, likewise, has two circuit breakers. Shaft 35 is driven by pinion 36 and a toothed segment 37 that engages pinion 36 and can be swiveled around an axis 39 which may be displaceable about a control curve 38. The swiveling of the toothed segment 37 is effected by a cam scanner 40 hinged onto it and that scans a control cam 41 mounted on front lens head 1.

Starting with the well-known equation $$u \times v = f^2,$$

where $u$ is the distance from the focus on the side of the object to the object, $v$ is the distance from the focus on the side of the image to the image, and $f$ is the focal length, it is possible to shift the base objective 2 in proportion to the adjustment of the focal length, when control curve 41 presents a gradient that is proportional to $f^2$. With the aid of a setting device 42, it is possible to preprogram the distance $u$ desired or needed for taking the picture, by a change of the position of axis 39 mounted on the setting device for toothed segment 37 within curve 38. The scale assigned to the setting device 42 is proportional to $u$.

When switch 29' has been turned to position II and the focal length is adjusted, toothed segment 37 that produces quotient $f^2/u$ rotates pinion 36 and contact disk 34, by means of curve 41 and scanner 40. At the same time, the current collectors 32 connects motor 23 with the battery voltage driving the base objective. The conversion of the path of adjustment of the base objective in proportion to $v$ can take place, in analogy to parts 41, 40, 37 - by way of a variable curve (not shown) for the base objective 2. Motor 23 is driven until the adjustment of the focal length is completed and the current collectors 32 of disk 33 lie opposite the current-breakers of contact disk 34.

Due to the high power of refraction of the base objective, it is possible to achieve macro-focusing by means of small paths of displacement. In this case, the focusing plane remains constant even in the case of modifications of the focal length, when $u$ (focusing device 42) has been pre-programmed.

Figure 5:
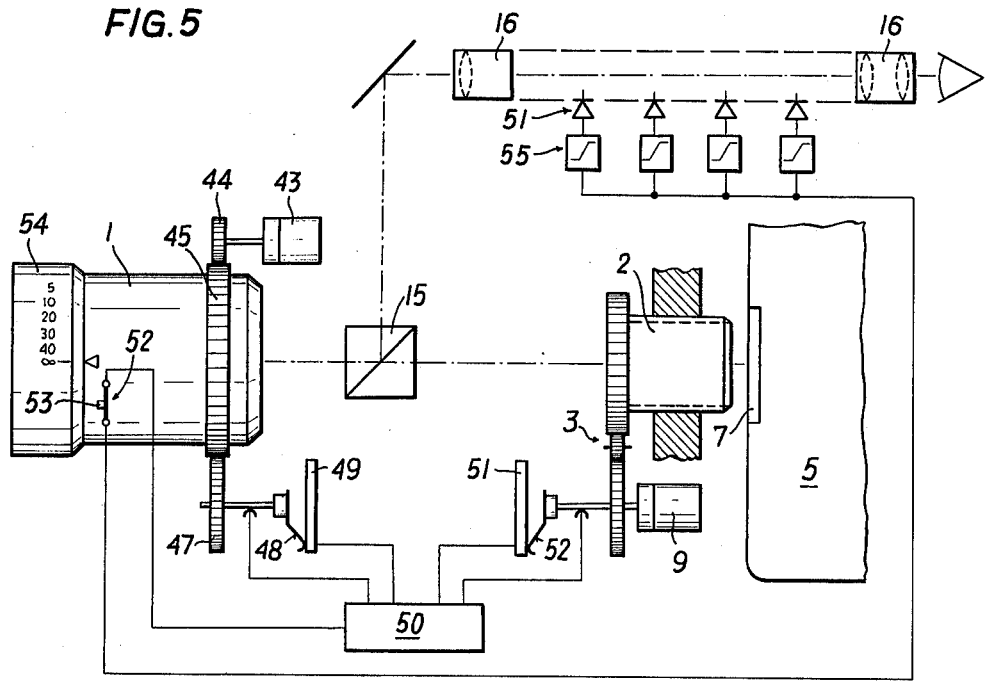
FIG. 5 is a schematic illustration of still another modification of the drive control system for the base objective in the device of FIG. 1.

A particularly advantageous design in accordance with the invention is shown in FIG. 5. The adjustment of the base objective as a function of the diaphragm setting is done by the motor, in accordance with FIG. 1. For the sake of simplicity, the control of the lamellae of the diaphragm by motor 9 is not shown again.

In addition, a motor 43 for the adjustment of focal length has been provided, driving a spur gear 45 on the head 1 by way of a driving pinion 44. As a result of the rotation of the spur gear 45 by pinion 47, a wiper 48 is rotated relative to a stationary contact disk 49; in accordance with the relative angular position of wiper 48 and disk 49, an output signal that is proportional to the focal length $f$ or $f^2$ or to $\log f$ or $\log f^2$, is conveyed to a junction device 50. Similarly, this is done by motor 9 for setting the diaphragm, by means of a stationary contact disk 51 and a wiper 52, driven by motor 9 and an output signal proportional to aperture stop $k$ or to the logarithm of aperture stop $k$ is conveyed to junction device 50.

Junction device 50, in turn, emits an output signal that contains the shortest permissible range for taking a picture (front depth of focus range $u_1$) or the still allowable size of the object for a format-filling picture (optical reduction V at the front depth of focus range). This output signal may be computed on the basis of the formula mentioned at the outset, viz.

$$u_1 = (f^2/2 \times U \times k)$$

or on the basis of the equation $V = c(k/f)$, in which $(1/2 \times U)$ and/or $c$, represent constant factors. In the case of logarithmic division proportional to $f^2$ and/or to aperture stop $k$ of disks 49, 31, the computation of the distance $u_1$ may be done by simple subtraction. When disks 49, 51 are not divided logarithmically, the quotient $(f^2/k)$ or $(k/1)$ may also be found by means of a bridge circuit.

The desired information is indicated to the operator of the camera in the viewfinder by means of luminous diodes 51 with which threshold value switches 55 set at different values have been connected in circuit.

Within the transfer circuit between diodes 51 and junction device 50, a switch 52 has been placed that can be actuated by a peg 53 on the focusing control ring 54 of head 1. The connection between junction device 50 and indicating device 51 is broken by switch 52, in case of a range setting of the front lens outside the position of infinity, that is, when the rear depth-of-focus range is limited.

Figure 6:
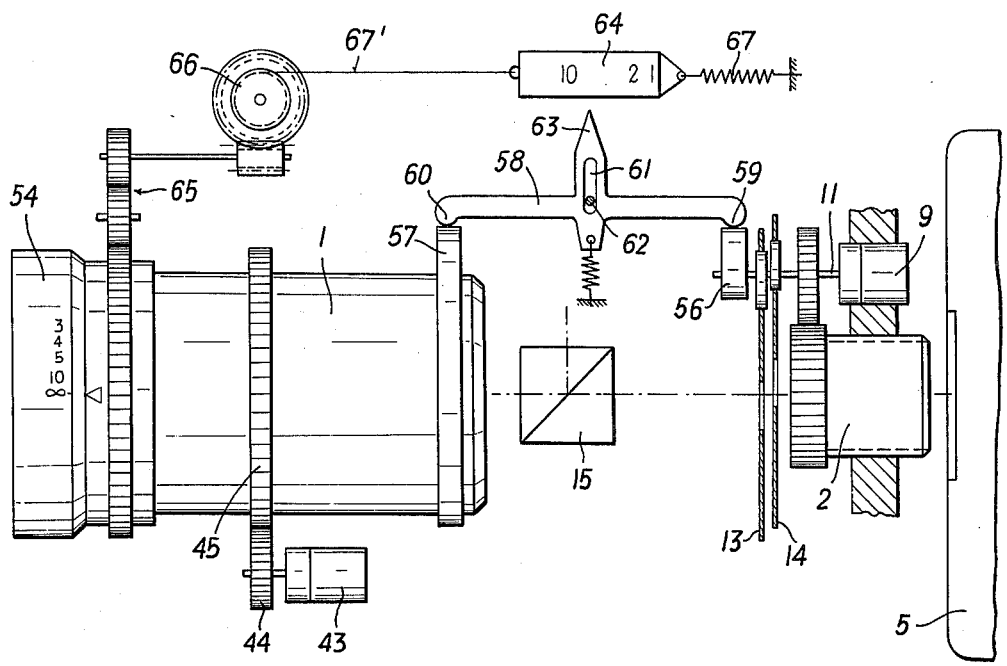
FIG. 6 is a diagrammatic illustration of a mechanical arrangement for indicating the front depth-of-focus limit to the camera operator.

A mechanical solution for indicating the front depth-of-focus limit $u_1$ to the operator of the camera is shown in FIG. 6. Instead of contact disk 51 of FIG. 5, a cam 56 is coupled with diaphragm control motor 9 by way of shaft 11. On the other hand, head 1 being controlled by motor 43 that controls the focal length, has a cam 57. Both cams, 56 and 57, have been provided with a logarithmic gradient proportional to the focal length $f$ or $f^2$ (cam 57) and to aperture stop $k$ (cam 56).

A cross-shaped lever 58 supports two points 59, 60 one of which 59 engages cam 56 while the other 60 engages cam 57. In addition, lever 58 has been mounted in such a way that it may be rotated and shifted through slit 61 along a stationary peg 62. Finally, an extension 63 of lever 58 acts as an indicator which, is visible in the viewfinder of the camera. An adjustable scale 64 has been assigned to indicator 63. The adjustment of the scale takes place against a spring 67 by means of front adjustment ring 54 by way of a gear unit 65 with a drum 66. On the drum, a cable line 67' has been wound which is connected with scale 64.

When focal length $f$ is adjusted by means of motor 43 and of diaphragm 13, 14 and/or of the base objective 2 by means of motor 9, points 59, 60 will be shifted according to logarithm $k$ or logarithm $f^2$ respectively whereby, the difference of the paths of adjustment is sensed by lever 58. Then, indicator 63 immediately indicates the allowable front depth-of-focus range $u_1$ depending on the range setting through the front lens.

Figure 7:
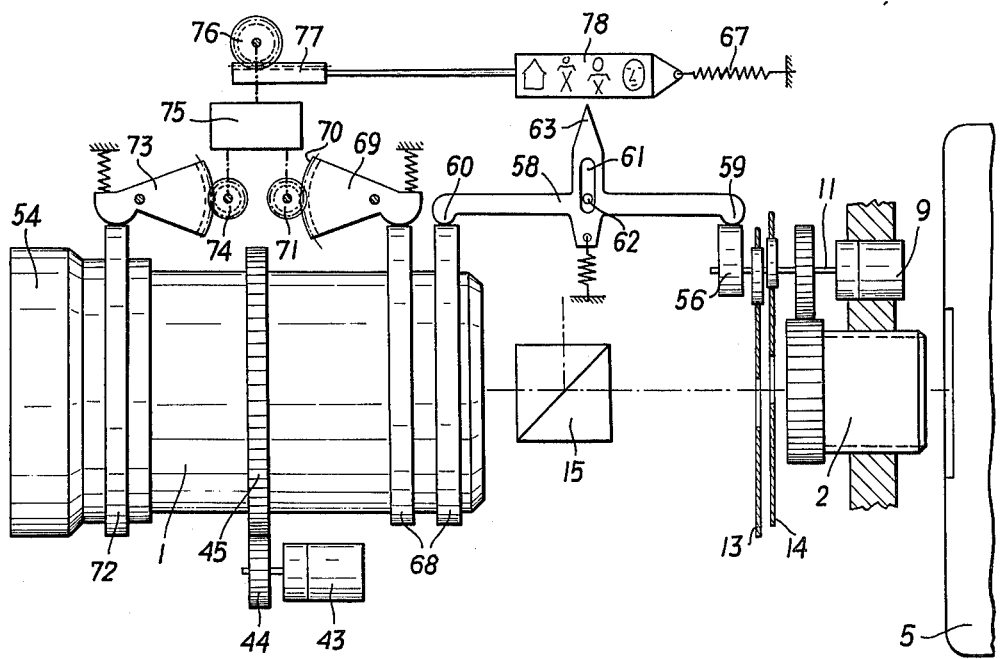
FIG. 7 is a diagrammatic illustration of a modification of the mechanical arrangement of FIG. 6.

A similar device is shown in FIG. 7, but this does not show the front depth-of-focus range, but rather the allowable size of the object for a format-filling picture. On head 1, two similarly shaped cams 68 have been provided, which, like cam 57, have a logarithmic gradient which, however, is proportional to logarithm $f$. As a matter of principle, it would be possible to provide a single cam 68 only. Inasmuch as the scanning path of scanner 59 which engages cam 56, is proportional to logarithm $k$ (according to FIG. 6) during the adjustment of the diaphragm and/or of the base objective, the difference between logarithm $k$ and logarithm $f$ (cam 68) is indicated by compound lever 58. In accordance with the equation $$V_1 = c_1 \times (k/f),$$

where $c_1$ is a constant value, the deviation of indicator 63 immediately indicates a measurement of the optical reduction $V_1$.

In addition, a spring-loaded scanner 69 which rotates around a stationary axis, engages cam 68 by means of a gear 70. A pinion 71 may be rotated by the toothed segment 70 during the scanning of cam curve 68.

An additional cam curve 72 that is connected with frontal member 54 for the purpose of rangefinding is scanned by a spring-loaded scanner 73 which, like scanner 69, can be rotated and, by doing so, drives a pinion 74. The two pinions 71 and 74 are connected by way of a differential 75. A gear wheel 76 at the end of differential 75 drives a movable rack 77, connected directly with a scale 78 which is visible, for example, in the viewfinder of the camera and which changes, when driven by gear wheel 76, its position relative to indicator 63, against the tension of spring 67. Scale 78 and/or indicator 63 indicate(s) symbolically the size of the object in accordance with on the focal length and on the diaphragm that is still allowable in order to achieve a sharply defined and format-filling picture.

The shape of cam 72 is proportional to the logarithm of focusing distance $u$ of the object from the focus on the object side.

Accordingly, scale 78 assumes, following the focusing of front lens 54, a position relative to indicator 63 at zero, that indicates the size of the object on the picture which can be taken so as to fill the format.

Figure 8:
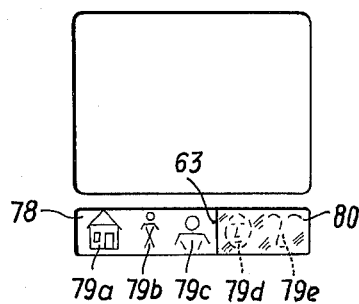
FIG. 8 is a view of the scale graduations visible to the operator of the camera when the front lens are focused on infinity.
Figure 9:
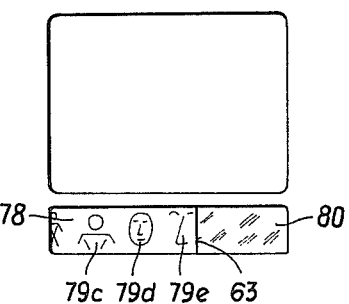
FIG. 9 is a view similar to FIG. 8 showing the scale graduations after adjustment of the front lens for the largest possible picture range.

The scale graduations that are visible to the operator of the camera are shown in FIGS. 8 and 9.

FIG. 8 shows the picture of the scale when the front lens is focused on infinity. Thus, all symbols 79a to 79e of scale 78 are visible. By servo-focusing in accordance with the invention, for instance according to FIG. 7, indicator 63 is placed opposite symbol 79 c. Now, the photographer knows that, according to the camera setting and/or to the exposure of the film, objects up to the size of a half-length photo can be taken and still achieve a sharply defined, format-filling picture.

If the picture is to be taken within a space, the photographer will first compute the largest possible picture range (diagonal of the space) and adjust the front lens accordingly. Scale 78 is thereby shifted to the left, as may be seen for instance in FIG. 9. Thus there is obtained the most simple indication as to which image area is available for the picture under changed conditions. It is evident that in lieu of scale 78 with the symbols 79 to 79e, scale 64 with the indications for the shortest allowable front depth-of-focus range can be made visible in the view-finder.

For a clearer indication, the field to the right of indicator 63 may be covered by a flag 80.

Figure 10:
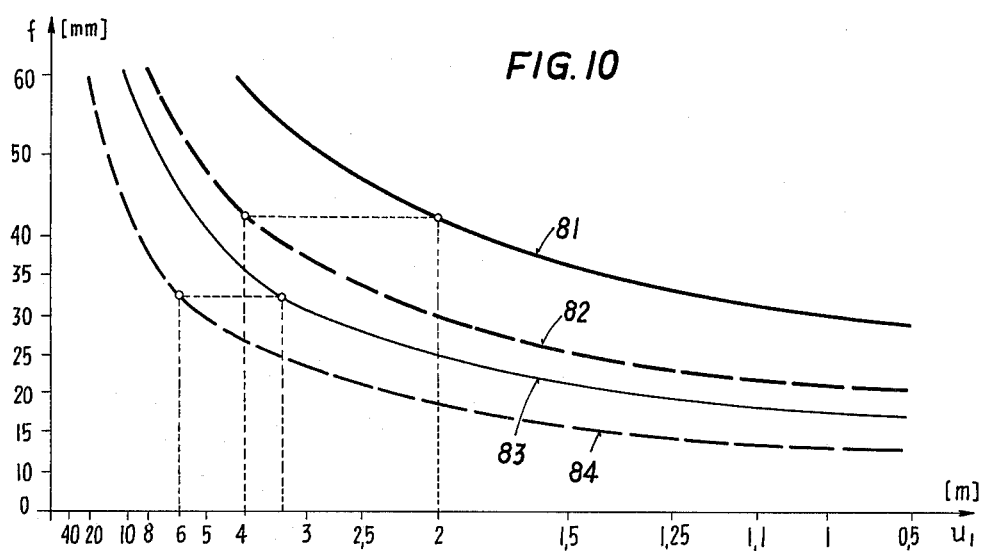
FIG. 10 shows a set of curves illustrating the advantages of the invention.

By way of conclusion, we shall illustrate convincingly by the diagram in FIG. 10, the advantages obtainable over known systems, for example the system known from Austrian Pat. No. 240 620, be by means of the invention. On the abscissa, the distance $u_1$ from the focus on the object side to the front depth-of-focus range has been plotted. The focal length $f$ has been plotted on the ordinate.

The conditions as shown by the solid curves 81, 83 can be achieved by the method in accordance with the invention and/or by the camera in accordance with the invention, while the dotted curves 82, 84 are assigned to the known camera (with an original aperture of $k =$ 1.2). For example, with a diaphragm aperture stop of $k=22$ (solid curves 81, 83), the allowable range will still be $u_1=2m$ for a focal length of 52.5 mm in the camera in accordance with the invention, while in the case of the known device, there will be a loss of 100% in the still allowable distance from the object (4 m.).

Also an advantage is shown, particularly clearly, in the case of a smaller diaphragm aperture stop, for instance, $k=8$ (curves 83, 84), where it is possible to shoot with the camera in accordance with the invention when the distance from the object is to $u_1=3$ m and at a focal length of $f=35$ mm, while a sharply defined picture can be achieved by the known camera only at a distance from the object of 6 m.

However, on the basis of a simple recomputation, this means also that at the same optical reduction, it is possible in accordance with the method of the invention to work with a considerably larger diaphragm aperture, so that picture-taking will be possible under unfavorable lighting conditions also.

The invention is not restricted to the use of an electromotor for the adjustment of the base objective and/or of the lamellae of the diaphragm. There is a conceivable use of galvanometers, of moving iron and rotary magnet systems, or generally of devices that convert an electric value into a mechanical one.

Instead of the follower control devices shown in FIGS. 2 to 4, potentiometers, opto-electric, inductive, capacitive transformers, etc. could be used, likewise, for instance the luminous diodes schematically shown in FIG. 5 as indicating devices could be replaced by small lamps, if necessary of different colors.

Figure 11:
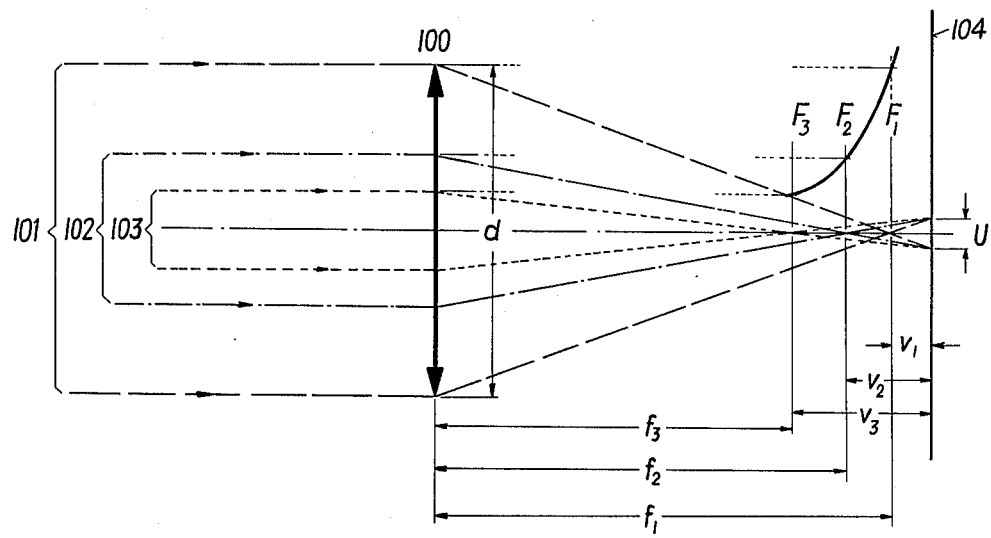
FIG. 11 is a diagrammatic sketch of another arrangement in accordance with the invention.
Figure 12:
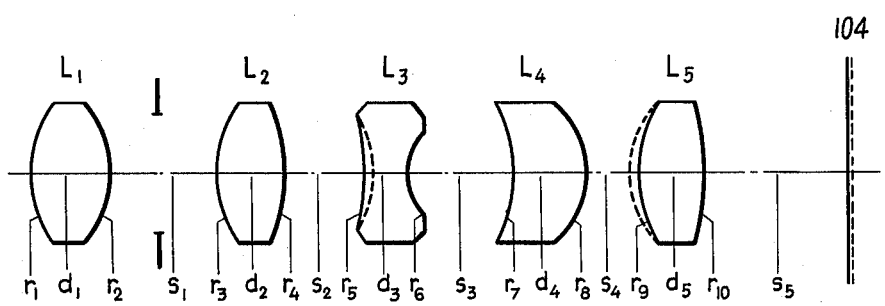
FIG. 12 is a schematic arrangement of the embodiment of FIG. 11.

A design of the invention based exclusively on optical means in shown by FIGS. 11 and 12. In FIG. 11 the image of infinitely remote objects is shown schematically for various diaphragm openings. The pencil of rays 101 corresponds to the maximum opening of an objective 100, that is to a diaphragm aperture number of $k=2$. The pencil of rays 102 corresponds to a diaphragm aperture of $k=4m$, the pencil of rays 103 to $k=8$. The pencils of rays 101, 102, and 103 intersect in a plane 104, after intersecting, each in its focus, the optical axis of objective 100. The plane 104 corresponds to the plane of the film of a camera; the image of the infinitely remote object with a diameter of U (diameter of the circle of diffusion) is certainly not sharply defined, but at a fraction of U over a focal length $f$ this out-of-focus image of the object does not have any noticeable consequences for a photographic picture.

It may be seen from FIG. 11 that the foci $F_2$ and $F_3$ do not coincide with the focus $F_1$. This phenomenon is due to a certain aperture defect of objective 100, which can be defined by the following derivation. According to the beam theorem, the ratio of diameter $d$ of objective 100 to diameter U of the circle of diffusion is equal to the ratio of the focal length $f$ to the distance of the focus $v$ to the plane 104.

$$d/U = f/v$$

$$v = (f/d) \times U \text{ when } (f \cdot d) = k$$

$$v = k \times U$$

Verbally expressed, this condition means that when postulating a constant diameter U of the circle of diffusion, the distance of the focus from the plane of the image 104 is directly proportional to diaphragm aperture $k$. This is also clearly evident from FIG. 11.

Now, if objective 100 has an aperture defect characterized by the above equation, the circle of diffusion will remain constant for any diaphragm aperture. In this way, the advantage is achieved, over known objectives in that even with smaller aperture stops and a constantly large circle of diffusion, the rear depth-of-focus range remains in infinity without losing any of its sharp definition at maximum diaphragm aperture.

The aperture defect of the objective is characterized by curve 105. The development of the aperture defect encounters problems of production technology at smaller aperture stop figures.

In FIG. 12, a design of an objective is shown that has an aperture defect according to FIG. 11. The lens contours drawn in solid lines show a fully corrected base objective for a movie camera. If the objective in accordance with the invention is intended to have a certain aperture defect, radii $r_5$ and $r_9$, and/or the distance $s_5$ from the last lens apex to the plane of the image 104 will be modified. It is evident that the change of radii for attaining the desired aperture defect cannot take place on predetermined lens surfaces, but that it differs for any design of an objective. In the following table, the data of the base objective as shown in FIG. 12 will be indicated. With regard to radii $r_5$, $r_9$ and to the distance $s_5$, the upper value applies to the fully corrected example, while the lower value of the tabulation applies to the example with the aperture defect in accordance with the invention. In addition, the lens thicknesses have been designated by $d$ in the table; the distances of the apices, the indices of refraction, and the Abbe numbers have been designated by $s$, $n_d$, and $v_d$, respectively.

| | | | | | |
|---|---|---|---|---|---|
| $L_1$ | $r_1$ | + 3,166 | $d_1 = 0{,}177$ | 1,689 | 49,5 |
| | $r_2$ | − 31,162 | $s_1 = 0{,}62 + 0{,}27$ | | |
| $L_2$ | $r_3$ | + 0,974 | $d_2 = 0{,}32$ | 1,713 | 53,8 |
| | $r_4$ | − 9,037 | $s_2 = 0{,}193$ | | |
| $L_3$ | $r_5$ | − 1,5 | $d_3 = 0{,}355$ | 1,785 | 26,1 |
| | $r_6$ | + 0,849 | $s_3 = 0{,}355$ | | |
| $L_4$ | $r_7$ | − 4,586 | $d_4 = 0{,}22$ | 1,641 | 60,1 |
| | $r_8$ | − 1,33 | $s_4 = 0{,}11$ | | |
| $L_5$ | $r_9$ | + 1,165 | $d_5 = 0{,}33$ | 1,641 | 60,1 |
| | $r_{10}$ | − 7,204 | $s_5 = 1{,}135$ | | |

Having thus described the invention, what is claimed is:

1. A camera comprising
an objective consisting of a forward lens unit and a base objective having fixed focal length, said forward lens unit having displaceable lens means for varying the focal length of said objective, said objective defining an image plane,
a film plane and an aperture diaphragm arranged between said lens means and said film plane,
said camera further comprising means automatically shifting said image plane for defining a substantially constant circle of diffusion at said film plane when imaging an object with different focal length settings and openings of the aperture diaphragm,
said means comprising drive means for displacing said base objective substantially in direct proportion to the diaphragm stop $k = f/d$ of the aperture diaphragm in an axial direction, where $f$ designates the focal length of the objective and $d$ denotes the diameter of the entrance pupil.

2. A camera in accordance with claim 1 wherein said drive means which is solely assigned to the base objective is controlled in accordance with the aperture stop of the aperture diaphragm and a follower control device for switching on said drive means for the base objective for adjustment of said base objective until the adjustment of said base objective corresponds to the size of the aperture stop.

3. A camera in accordance with claim 2, including an additional control device for adjusting the base objective axially, independently of the setting of said diaphragm.

4. A camera in accordance with claim 3 including a second follower control device, means for switching said drive means for said base objective onto said second follower control device to effect the shifting of the base objective in proportion to the square of the focal length $f$ of the objective, so that said lens means may be adjusted to any desired distance with the aid of the base objective.

5. A camera in accordance with claim 1 including an electric motor drive for said aperture diaphragm, said electric motor drive being combined with said drive means for said base objective, and including a gear train for coupling said base objective to said drive means.

6. A camera in accordance with claim 5, wherein said aperture diaphragm is provided with lamellae and including a disengaging clutch between said electric motor drive for the lamellae of the aperture diaphragm and said drive means for said base objective.

7. A camera in accordance with claim 6, wherein said electric motor drive is arranged to adjust the lamellae of said aperture diaphragm through a symmetrical gear train from a position corresponding to the maximal diaphragm aperture in either direction of rotation of said motor, with an adjustment of the aperture diaphragm for a fading out taking place at the same time, and including a linking device in the drive means for the base objective, which, starting with the position of maximum aperture, establishes a driving connection to the base objective in one direction and disconnects it in the other direction, and including switching means by which the polarity of the electric drive motor may be reversed and which permits said motor to be returned to the position corresponding to the maximum aperture.

8. A camera in accordance with claim 7, wherein said drive means for said base objective includes a control gear unit having a gear wheel and wherein said linking device comprises a toothed segment having an untoothed gap driven by said motor and which, upon adjustment in one direction starting with the diaphragm corresponding to the maximum opening, meshes with said gear wheel of said control gear unit for the base objective and which, upon adjustment in the other direction, said segment with its toothed gap is counterpositioned with respect to said gear wheel.

9. A camera in accordance with claim 1 wherein said objective includes a distance adjustment, so that the rear depth-of-focus range may be fixed for certain distances.

10. A camera in accordance with claim 1 including a quotient determining device for the determination of the quotient $q = k/h$ where $h$ is a factor proportional to the shortest allowable distance for picture-taking, $f$ is the focal length of the objective, and $k$ is the aperture stop, said device being arranged to convert the setting of the objective and of the aperture diaphragm at values proportional to a function of $f^2$ and $k$, and including a junction device for both said values.

11. A camera in accordance with claim 10, wherein said quotient determining device consists of electric transformers, the output circuit of which is provided with an indicator, preferably mounted within the camera viewfinder, said indicator comprising a threshold value switch and a plurality of illuminating devices connected to said threshold value switch.

12. A camera in accordance with claim 10 wherein said values proportional to a function of $f^2$ and $k$ are values proportional to $\log f^2$ and $\log k$.

13. A camera in accordance with claim 12, wherein the device for setting the focal length and the device for the setting the diaphragm are coupled with curve members that interact with scanners, said curve members being shaped so that the paths of the scanners correspond to $\log f^2$ and $\log k$, respectively, while the difference of the adjusting paths of the scanners is formed by a lever gear unit upon which the scanners engage, and including an indicator device controlled by said lever gear unit for the quotient $q$ which is mounted inside the viewfinder of the camera.

14. A camera in accordance with claim 13, wherein said objective is provided with front lens focusing, and wherein said indicator device comprises a pointer that moves in front of a scale, said scale being arranged to be shifted according to the focusing range on said front lens.

15. A camera in accordance with claim 1 including a device for the determination of optical reduction on the front depth-of-focus limit $V_1 = c \times (k/f)$ where $c$ is a constant factor, while $k$ is the aperture stop and $f$ is the focal length of the objective, said device being arranged to convert the setting of the objective and of the aperture diaphragm into values that are proportional to a function of $k$ and $f$, and including a junction device for said two values.

16. A camera in accordance with claim 15, wherein said optical reduction determining device consists of electric transformers, the output circut thereof containing an indicator device, preferably mounted with the viewfinder of the camera said indicator device comprising a threshold value switch and a plurality of illuminating devices connected to said threshold value switch for optical reduction on the front depth-of-focus limit in the form of symbols.

17. A camera in accordance with claim 15 wherein said values proportional to a function of $k$ and $f$ are values proportional to $\log k$ and $\log f$.

18. A camera in accordance with claim 17 wherein the device for setting the focal length and the device for setting the diaphragm are coupled with curve members which interact with scanners, said curve members being shaped in such a way that the paths of the scanners correspond to $\log k$ and/or $\log f$, respectively, while the difference of the adjusting paths of the scanners is formed by a lever gear unit upon which the scanners engage, a viewfinder and including an indicator device mounted within the viewfinder and controlled by said lever gear unit for optical reduction on the front depth-of-focus limit.

19. A camera in accordance with claim 18, wherein said objective is provided with front lens focusing and with an indicator device comprising a pointer that moves in front of a scale, said scale being arranged to be shifted according to the quotient of $u$, where $f$ is the focal length of the objective and $u$ is the distance set on the front lens.

20. A camera in accordance with claim 19, wherein said drive means for said base objective is arranged to be returned to zero-position and switched off, and including a device that renders ineffective in the indicator device for the shortest allowable shooting distance and/or for optical reduction on the front depth-of-focus limit when the drive means for the base objective is switched off and/or when the distance-setting of the front lens is outside the zero-position.

21. A camera in accordance with claim 20, including a range-indicator unit, arranged to be introduced into the path of rays of the viewfinder when said drive means for said base objective is turned off.

22. A camera comprising an objective consisting of a forward lens unit and a base objective having fixed focal length, said forward lens unit having displaceable lens means for varying the focal length of said objective, said objective defining an image plane, and a film plane and an aperture diaphragm arranged between said lens means and said film plane, wherein said objective is designed to have, at least over a certain area, an aperture defect that shifts said image plane for defining a substantially constant circle of diffusion at said film plane when imaging an object with different focal length settings and openings of the aperture diaphragm, by means of marginal rays according to the condition $$v = U \times k,$$

where $v$ is the distance of the circle of diffusion with a diameter U from the focal point and where $k$ is the aperture stop as defined by the condition $k = (f/d)$, wherein $f$ is the focal length in each case and $d$ the diameter of the entrance pupil.

23. A camera in accordance with claim 22, wherein said objective consists of a pancratic head of variable enlargement and of a base objective of fixed focal length, characterized by the data in the base objective listed below where $r$ is the radii of the lenses, $d$ is the lens thicknesses $s$ is the distances of their apices, $n_d$ is the refractive indices, and $v_d$ is the Abbe numbers:

|  |  |  |  | $n_d$ | $v_d$ |
|---|---|---|---|---|---|
| $L_1$ | $r_1$ | + 3,166 | $d_1 = 0,177$ | 1,689 | 49,5 |
|  | $r_2$ | − 31,162 | $s_1 = 0,62 + 0,27$ |  |  |
| $L_2$ | $r_3$ | + 0,974 | $d_2 = 0,32$ | 1,713 | 53,8 |
|  | $r_4$ | − 9,037 | $s_2 = 0,193$ |  |  |
| $L_3$ | $r_5$ | − 1,764 |  |  |  |
|  |  | − 1,5 |  |  |  |
|  | $r_6$ | + 0,849 | $d_3 = 0,355$ | 1,785 | 26,1 |
|  |  |  | $s_3 = 0,355$ |  |  |
| $L_4$ | $r_7$ | − 4,586 | $d_4 = 0,22$ | 1,641 | 60,1 |
|  | $r_8$ | − 1,33 | $s_4 = 0,11$ |  |  |
| $L_5$ | $r_9$ | + 1,236 |  |  |  |
|  |  | + 1,165 |  |  |  |
|  | $r_{10}$ | − 7,204 | $d_5 = 0,33$ | 1,641 | 60,1 |
|  |  |  | $s_5 = 1,135$ |  |  |

* * * * *